Nov. 2, 1926.
H. S. JANDUS
1,605,409
BUMPER FOR AUTOMOBILES
Filed Jan. 28, 1924
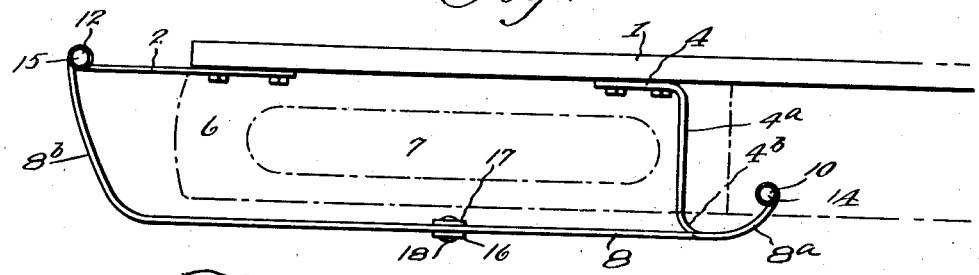
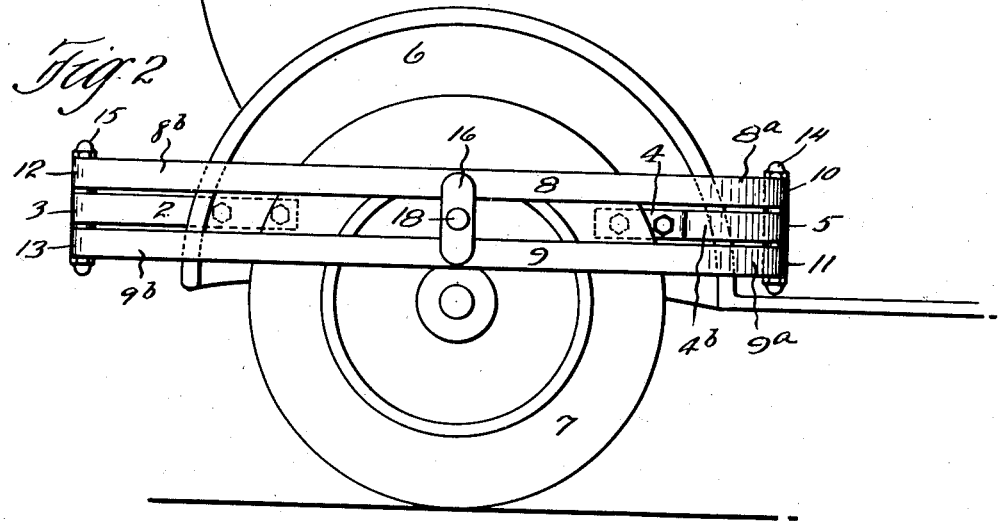
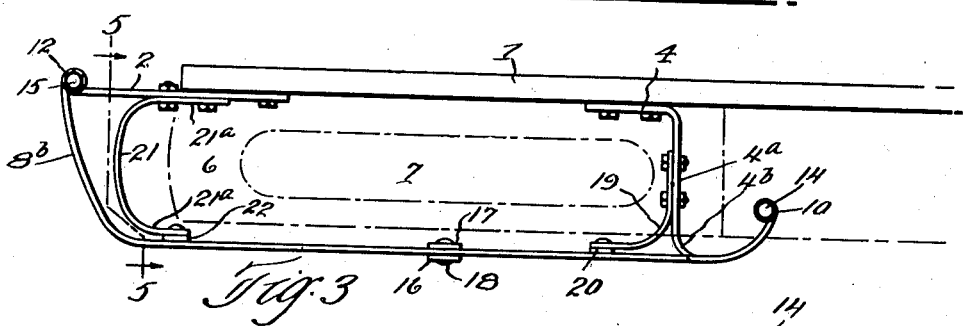
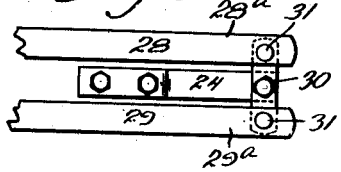
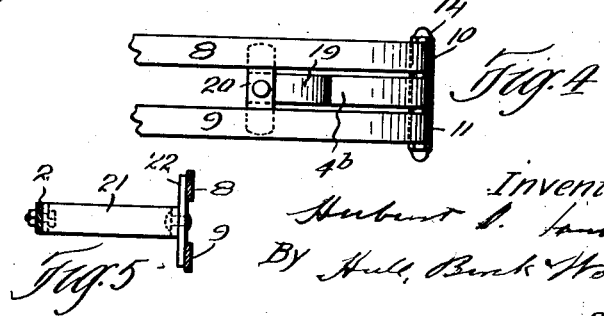

Patented Nov. 2, 1926.

1,605,409

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER FOR AUTOMOBILES.

Application filed January 28, 1924. Serial No. 689,002.

This invention relates to bumpers, and more particularly to bumpers which are adapted to protect the ends and the sides of fenders and wheels of automobiles or similar vehicles.

It is the general purpose and object of the invention to provide a bumper of this character which is capable of performing its functions in a most efficient manner, and which can be conveniently swung out of the way when occasion requires, to afford access to the wheel or fender with which it is associated. Further and more limited objects of the invention will appear in the specification; and the aforesaid objects will be realized in and through the combinations of elements embodied in the claims.

In the drawings Fig. 1 represents a plan view of the rear end of one side of an automobile having my invention applied thereto, the rear wheel and fender being indicated in dot-and-dash lines; Fig. 2 a side elevation of the parts shown in Fig. 1; Fig. 3 a view, similar to Fig. 1, of another form of my invention; Fig. 4 a side elevation of the front of the bumper shown in Fig. 3; Fig. 5 a sectional detail corresponding to the line 5—5 of Fig. 3; and Fig. 6 a view, similar to Fig. 4, of a further form of my invention.

Describing the various parts by reference characters and in connection with Figs. 1 and 2, 1 denotes one of the side sills or members of an automobile. Secured to and projecting rearwardly from the rear of the side sill 1, is an arm 2, the said arm being shown as of bar or plate material, such as is usually employed for the construction of vehicle springs, said bar having an eye 3 at the rear end thereof. Secured to the sill or member 1, at an appropriate distance from the bar 2, is a bar comprising an attaching portion 4 which bears against and is bolted or otherwise secured to the member 1, an outwardly extending portion $4^a$, and a forwardly curved portion $4^b$, the forwardly curved portion terminating in an eye 5.

The rear end of the bar 2 is at the rear of the fender 6 and at the inner edge of the same. The forward end of the bar $4$—$4^b$ is in front of the fender 6 and overlaps the front portion thereof. The two bars constitute means for supporting the bumper which means protects the side and ends of the fender as well as the wheel 7. The main bumper comprises an upper bar 8 and a lower bar 9 each having a forwardly and inwardly curved front end $8^a$, $9^a$, respectively, and each having a rearwardly and inwardly curved rear end $8^b$, $9^b$, respectively.

For convenience of description, the bumper will be considered as associated with the rear fender of an automobile, and the terms "front" and "rear" will be employed to identify the opposite ends of the bumper and its supporting parts.

Each of the bars 8 and 9 is provided at its front end with an eye 10, 11, respectively, while the rear end of each bar is provided with an eye 12, 13, respectively. The eyes 10 and 11 are arranged to register with the eye 5, while the eyes 12 and 13 are arranged to register with the eye 3; and the bars 8 and 9 are connected to the arms 2 and $4$—$4^b$ by means of bolts 14 and 15, the former bolt extending through the aligned eyes 10, 5 and 11 and the latter bolt extending through the aligned eyes 12, 3 and 13.

For the purpose of stiffening the bumper construction and adapting it to resist blows delivered from the side, the central portions of the bars 8 and 9 are connected by means of inner and outer clamping plates 16 and 17, respectively, the said plates being connected by a rivet 18.

By the construction of bumper shown and described hereinbefore, the front portion of the rear fender will be protected by the overhanging parts $4^b$, $8^a$ and $9^a$, the side of the fender and the wheel will be protected by the intermediate portions of the bars 8 and 9; while the rear portion of the fender and the wheel 7 will be protected by the inwardly and rearwardly extending parts $8^b$ and $9^b$ of the bars, the latter being supported at their ends against forward and inward movement by the arm 2.

In Figs. 3–5, inclusive, there is shown a modification of my invention wherein the parts 1—18, inclusive, are identical with the like-numbered parts in Figs. 1 and 2. In the construction shown in the last mentioned views, I provide additional strengthening or reinforcing means for the front and rear portions of the bumper. For this purpose, one end of a curved resilient arm 19 is bolted or otherwise fastened to the outwardly projecting portion 4ᵃ of the front bumper-supporting bar, the opposite end of the arm 19 being directed rearwardly and connected to a cross plate 20 which bears against the inner faces of the bars 8 and 9, but is disconnected therefrom. The curvature of the arm 19 is such that it is normally held under compression by the engagement of the plate 20 with the bars 8 and 9.

The rear portion of the bumper is strengthened in like manner by means of a resilient arm having a central curved portion 21, a forwardly projecting portion 21ᵃ which bears against and is secured to the arm 2, and a forwardly projecting outer portion which is secured to a cross plate 22 which extends across the space between the bars 8 and 9 and bears against the inner faces thereof, under compression.

By the construction shown and described in Figs. 3-5, the end portions of the bumper bars 8 and 9 are yieldingly and resiliently reinforced against impacts; and the said bars may be disconnected from either of the arms 2 or 4—4ᵇ and swung about the other arm as a pivot, without the necessity for disconnecting the bumper bars from the parts 19 and 21.

In Fig. 6 there is shown a still further form of the invention wherein, instead of connecting the ends of the bars 8 and 9 to either of the bars 2 or 4—4ᵇ by means of aligned eyes and bolts, these ends may be connected by means of cross plates. In Fig. 6, the bumper bars are indicated at 28 and 29, respectively; the front ends at 28ᵃ and 29ᵃ; and the front supporting bar or arm at 24. The front of the supporting bar or arm 24 is riveted or otherwise secured to the cross plate 30 which in turn may be bolted or otherwise detachably secured to the bars 28 and 29, by means of carriage bolts 31.

It will be understood that the rear ends of the bumper bars 28 and 29 may be connected in like manner to a bar arranged in the position of the bar 2 in the preceding forms of my invention.

Having thus described my invention, what I claim is:—

1. The combination, with a side member, wheel, and fender of an automobile, of a supporting arm extending rearwardly from the rear end of said member, a supporting arm extending outwardly from the said member and having its end located in front of said fender, and a bumper comprising one or more bars connected to said arms.

2. The combination, with a side member, wheel, and fender of an automobile, of a supporting arm extending outwardly and forwardly from the said member and having its end located in front of said fender, a second supporting arm extending rearwardly from the rear end of said member, a bumper comprising one or more bars connected to said arms.

3. The combination, with a side member, wheel, and fender of an automobile, of a supporting arm extending rearwardly from the rear end of said member, a supporting arm extending outwardly and forwardly from the said member and having its end located in front of said fender, and a bumper comprising one or more bars connected to said arms, one of such connections being a pivotal connection.

4. The combination, with a side member, wheel and fender, of an automobile, of a supporting arm secured to said member and projecting outwardly therefrom beneath said fender and having its front end extending about the front of the fender, one or more bumper bars secured to the front end of such arm, and means for securing the rear of such bar or bars to the rear portion of the side member.

5. The combination, with a side member, wheel and fender of an automobile, of a supporting arm secured to said member and projecting outwardly therefrom beneath said fender and having its front end extending about the front of the fender, one or more bumper bars secured to the front end of such arm, an arm secured to the said side member and projecting rearwardly therefrom, and means connecting the rear of said bar or bars to the rear end of the last mentioned arm.

6. The combination, with a side member, wheel and fender of an automobile, of a bumper adapted to extend across the side of the wheel and fender, means supporting each end of said bumper, and resilient means interposed between the said bumper and the side member and adapted to be compressed by the said bumper when supported in operative relation to said wheel and fender.

7. The combination, with a side member, wheel and fender of an automobile, of a bumper adapted to extend across the side of the wheel and fender, means supporting each end of said bumper, and resilient means interposed between opposite portions of said bumper and the side member and adapted to be compressed by the said bumper when supported in operative relation to said wheel and fender.

8. The combination, with a bumper adapted to extend across the wheel and fender of an automobile, of means supporting each end of said bumper, one of such means being a pivotal support, and resilient means interposed between the bumper and the side member and arranged to be compressed by the bumper when connected to its supporting means.

9. The combination, with a side member, wheel and fender of an automobile, of an arm secured to the said member and projecting outwardly therefrom adjacent to the front of said fender, an arm secured to and projecting rearwardly from the rear portion of said side member, an outwardly extending curved resilient arm fastened to each of the two first-mentioned arms, and one or more bumper bars connected to the two first-mentioned arms and arranged to engage the outer ends of the second-mentioned arms, one of the connections between such bumper bar or bars and the corresponding supporting arm being a movable connection.

10. The combination, with a side member, wheel and fender of an automobile, of a forward and a rear bumper support, the said supports being arranged at the front and the rear, respectively, of said fender, one or more bumper bars secured to the said supports, and one or more curved resilient bars adapted to be engaged by the bumper bar or bars thereby to oppose a yielding resistance to the movement of such bar or bars toward the wheel and fender.

In testimony whereof, I hereunto affix my signature.

HERBERT S. JANDUS.